E. SMITH.
HARVESTER-RAKE.
No. 187,676. Patented Feb. 20, 1877.
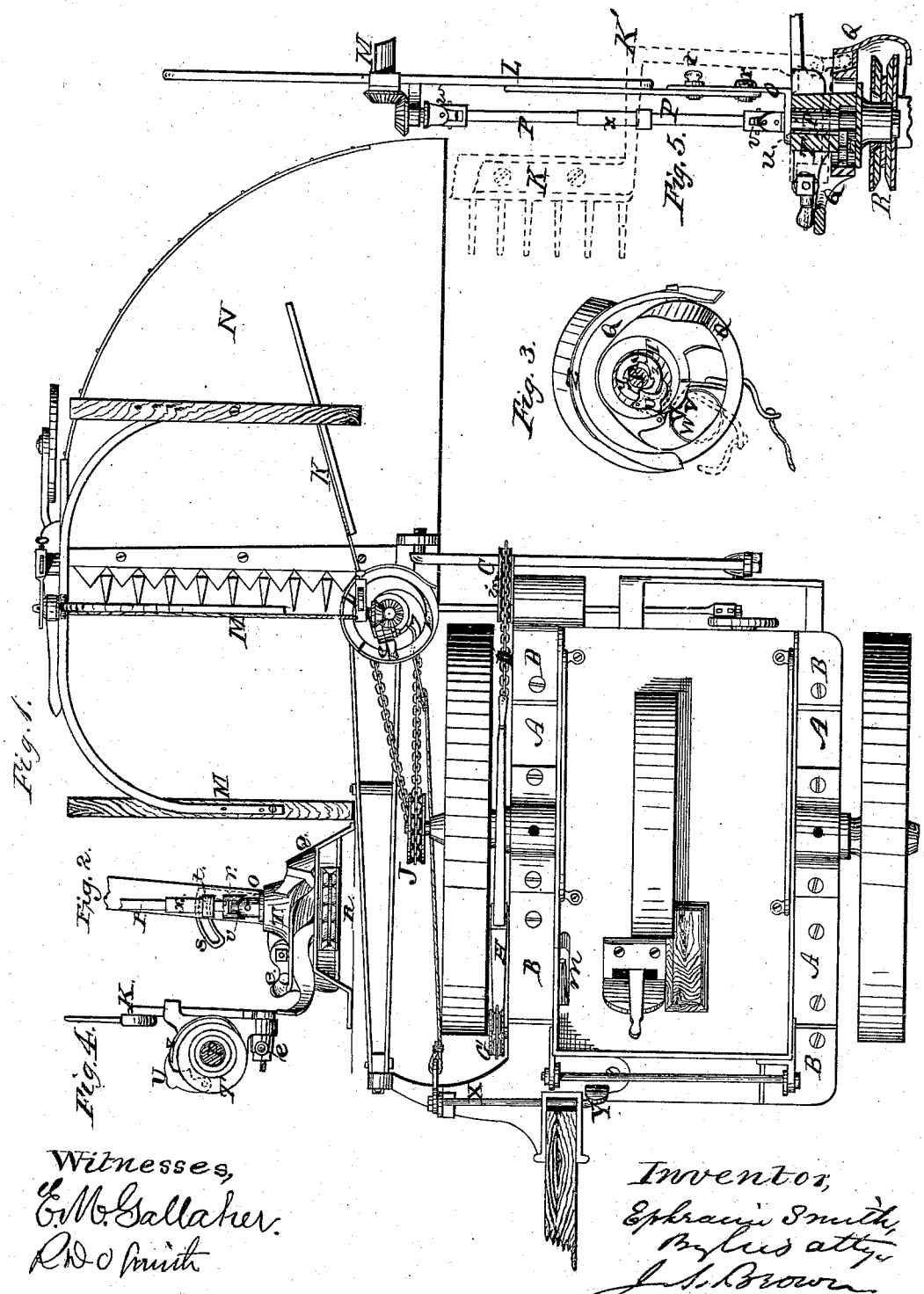

UNITED STATES PATENT OFFICE.

EPHRAIM SMITH, OF BELLAIRE, OHIO.

IMPROVEMENT IN HARVESTER-RAKES.

Specification forming part of Letters Patent No. 187,676, dated February 20, 1877; application filed July 18, 1873.

*To all whom it may concern:*

Be it known that I, EPHRAIM SMITH, of Bellaire, in the county of Belmont and State of Ohio, have invented certain Improvements in Harvesters; and I do hereby declare that the following is a full and exact description thereof, reference being had to the accompanying drawings, making part of this specification—

Figure 1 being a top view of a harvester provided with my improvements; Fig. 2, a side elevation of the rake and reel standard, and of the parts mounted thereon or attached thereto; Figs. 3, 4, and 5, views of parts detached.

Like letters designate corresponding parts in all of the figures.

My invention consists in an improved device for operating a rake in conjunction with the reel of a harvester, substantially as represented in Figs. 1, 2, 3, 4, and 5.

The rake K is mounted on a bent arm, K′, as shown in Fig. 5, by which it is carried below the reel, close to the platform, when in a horizontal position, and far enough away from the reel when in a vertical position, or returning therefrom to a horizontal position. The arm K′ is pivoted to the rake-carrier T near its lower end, its projecting heel traveling in or upon a stationary cam, Q. It has a movement around the reel-standard L, and its motions are so determined and regulated that by means of the cam-action it is carried backward over the platform N of the harvester in a horizontal direction, as required, and when it is returning to position between the arms of the reel, it assumes a nearly vertical position, thence again quickly descending to a horizontal position at the inner end of the reel and beyond its path, and then traveling below the same, or so low between the arms of the reel that it can move much more slowly than the reel without interfering therewith. At the same time the reel movement does not interfere with the adjustment of the reel-standard L, which, as shown in the drawings, is effected by being pivoted at *r* to the base O below, and by means of a fixed slotted arm, *s*, concentric with the said pivot, the standard being secured thereto at the desired inclination by a set-screw, *t*, passing through the same and the slotted arm. The base O of the reel-standard terminates in a sleeve, *u*, which surrounds the reel-driving shaft P, having its bearings in the stationary cam Q, that guides the movements of the rake. The driving-shaft P is jointed by a double or universal joint, *v*, just above the stationary cam Q, and again jointed by a similar joint, *w*, near the reel-driving gearing at the upper end of the shaft, thereby allowing the reel-standard to be adjusted to any desired inclination, and the shaft to be bent to adapt itself thereto without interfering with its revolving motion. The shaft is also made in two parts, with sliding connection *x*, to enable it to be automatically lengthened or shortened, to suit the different heights of the reel on its standard. The shaft receives its motion by means of a chain or rope pulley, R, below the cam Q, around which pulley runs a chain, rope, or belt from a driving-pulley, J, on the driving-shaft of the harvester.

Around and below the sleeved base O of the reel-standard is the revolving rake-carrier T, which is coupled to the shaft P, so as to revolve with it, or is uncoupled therefrom, so as to remain stationary, while the shaft continues to revolve by means of the following device, or its equivalent: On the inner periphery of the carrier T is pivoted a ratchet-pawl, U, which, when held in its innermost position, takes into one of four (fewer or more) ratchet-teeth, *y y*, on the driving-shaft, as shown in Fig. 3. There are, preferably, as many of these ratchet-teeth as there are reel-arms, and they are so arranged, in connection with the ratchet-pawl U, that when the latter gears into any one of the former, the rake K, in revolving, will pass, without interfering, between some two of the reel-arms, so that even when passing between the reel-arms it may move more slowly than the reel without interfering therewith. This is an important feature, since it will not do to have the rake travel so fast as the reel should move, because so rapid a motion would throw and scatter the gavel. When the rake is not to be in motion the pawl U is uncoupled from the ratchet-teeth by means of a removable gate, V, which is pivoted to the cam-stand at one end, and is held pushed in even with the inner periphery of the carrier-socket on the said stand by a spring, W, so that the pawl is continually held coupled to the ratchet-teeth while the latter are revolving. But when the gate is drawn out, as shown by dotted lines in Fig. 3, a spring, z, (shown most clearly in Fig. 4, which represents a bottom view of the rake and its carrier,) forces the pawl U out into the gateway thus opened the next time the pawl comes around opposite thereto, thereby uncoupling the pawl from the ratchet-teeth, and the rake consequently ceases to revolve. With this device the rake always automatically stops when it is in a vertical position away from the reel, and never can interfere with the movements thereof. This drawing out of the gate V is effected by means of a cord reaching therefrom forward to an arm on a rock-shaft, X, which is operated by a treadle, Y. When the rake is to be set in motion the driver releases his foot from the treadle, and the gate springs in again, and causes the pawl U to take into one of the ratchet-teeth, no matter which, as in any case the rake will pass between the arms of the reel. The cam Q is so constructed, by means of a groove, Z, therein, and of a guide-heel, e, on the rake, that the rake is lowered into a horizontal position, after which it passes between the arms of the reel and over the platform, and it is raised into a vertical position when returning to working position on the other side of the reel-standard. Its horizontal working position is shown by full lines in Fig. 5, which represents a central vertical section in part, and a side elevation in part, of the reel and rake operative apparatus, and the vertical position of the rake is indicated by dotted lines in the same figure.

What I claim as my invention, and desire to secure by Letters Patent, is—

1. The laterally-adjustable reel-standard L, constructed with a sleeve, u, on its base O, surrounding the reel-driving shaft P, inside of the rake-carrier T, constructed and arranged substantially as and for the purpose herein specified.

2. The combination of the carrier T, with its ratchet-pawl U, the driving-shaft P, with its ratchet-teeth y y, and the movable gate V, operating substantially as described, and for the purpose herein specified.

Specification signed by me this 30th day of August, 1872.

EPHRAIM SMITH.

Witnesses:
J. S. BROWN,
EDM. F. BROWN.